(12) United States Patent
Palumbo

(10) Patent No.: US 8,485,145 B2
(45) Date of Patent: Jul. 16, 2013

(54) BREATHER AIR—OIL SEPERATOR

(75) Inventor: Christofer J. Palumbo, Elmwood Park, IL (US)

(73) Assignee: International Engine Intellectual Property Company, LLC., Lisle, IL (US)

( * ) Notice: Subject to any disclaimer, the term of this patent is extended or adjusted under 35 U.S.C. 154(b) by 995 days.

(21) Appl. No.: 12/546,823

(22) Filed: Aug. 25, 2009

(65) Prior Publication Data

US 2011/0048391 A1   Mar. 3, 2011

(51) Int. Cl.
*F01M 13/00* (2006.01)
*F02B 25/06* (2006.01)

(52) U.S. Cl.
USPC ......... 123/41.86; 123/572; 123/573; 123/574

(58) Field of Classification Search
USPC ...................... 123/572–574, 41.86
See application file for complete search history.

(56) References Cited

U.S. PATENT DOCUMENTS

| | | | | |
|---|---|---|---|---|
| 3,246,639 A | * | 4/1966 | Oliver | ............................ 123/572 |
| 7,347,172 B2 | | 3/2008 | Strickler | |
| 7,424,884 B2 | * | 9/2008 | Woody | ........................... 123/517 |
| 7,699,029 B2 | * | 4/2010 | Herman et al. | ............. 123/41.86 |
| 7,789,076 B2 | * | 9/2010 | Borgstrom et al. | ........... 123/572 |
| 2007/0266705 A1 | | 11/2007 | Wood | |
| 2008/0223347 A1 | * | 9/2008 | Hommes et al. | ............... 123/572 |
| 2009/0223496 A1 | * | 9/2009 | Borgstrom et al. | ........... 123/573 |
| 2011/0030629 A1 | * | 2/2011 | Schleiden | ................... 123/41.86 |
| 2011/0048391 A1 | * | 3/2011 | Palumbo | ....................... 123/573 |

FOREIGN PATENT DOCUMENTS

DE   102008017919 A1 * 10/2009

* cited by examiner

*Primary Examiner* — Lindsay Low
*Assistant Examiner* — Tea Holbrook
(74) *Attorney, Agent, or Firm* — Mark C. Bach; Jeffrey P. Calfa

(57) ABSTRACT

A breather system for a crankcase of an internal combustion engine includes a gas compressor configured to elevate the pressure of crankcase blow-by gas. At least one gas-oil separator receives gas with entrained oil from the compressor, separates oil from the gas and discharges cleaned gas. The oil is re-circulated back to the crankcase. The cleaned gas is either discharged through the engine exhaust system or re-circulated back into the engine combustion air intake. A bypass conduit allows cleaned gas to be re-circulated from the gas-oil separator outlet to the compressor inlet to balance the blow-by production with the capacity of the compressor.

16 Claims, 1 Drawing Sheet

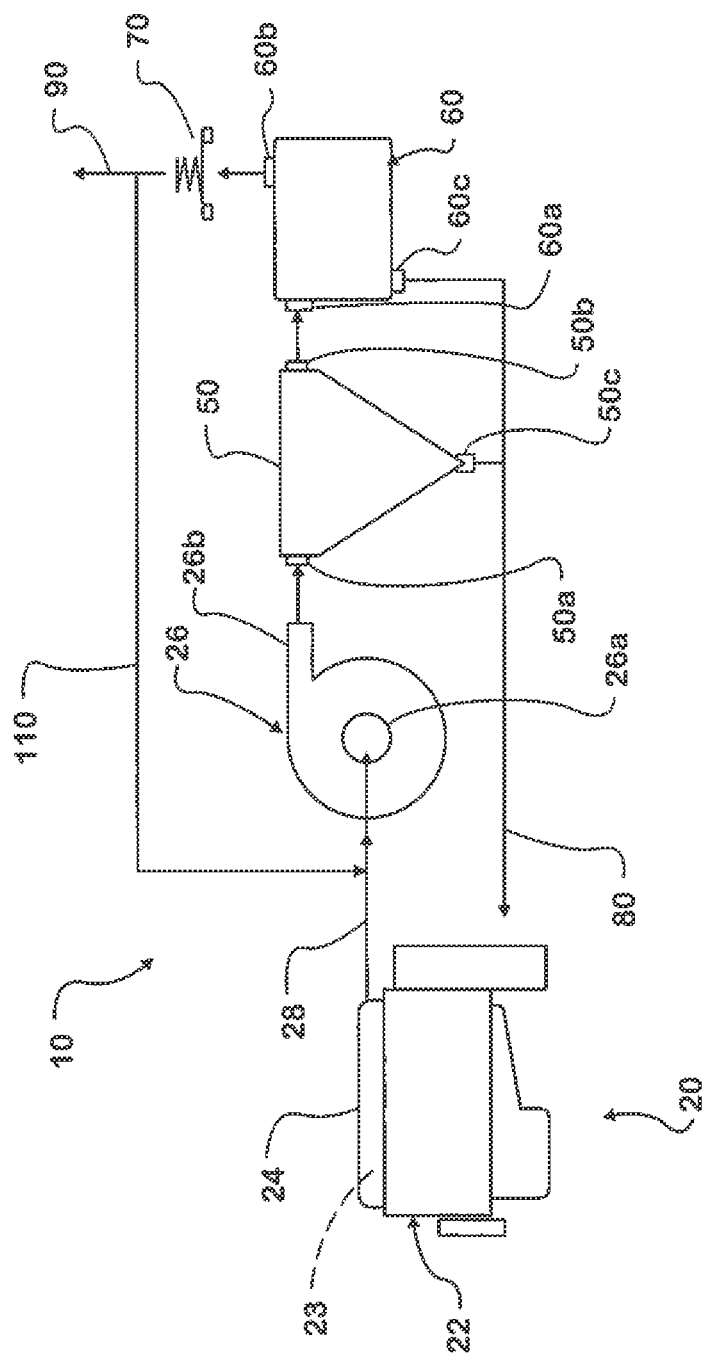

BREATHER AIR—OIL SEPERATOR

FIELD OF THE INVENTION

This invention relates to internal combustion engines, including but not limited to recirculation of crankcase gases into the intake system of an engine.

BACKGROUND

The present invention relates to a breather system for a crankcase of an internal combustion engine of the type which separates oil drops or mist from blow-by gases. The blow-by gases are routed to the intake air line of an engine to eliminate the discharge of combustion gases into the environment. Separated oil is routed back to the oil pan.

Ideally, the pressure within an internal combustion engine crankcase should be maintained at a level equal to or slightly less than atmospheric pressure to prevent external oil leakage through the various gasketed joints, such as that between the valve cover and the cylinder head. Combustion gases are generated during the operation of an internal combustion engine. A small amount of these gases leaks past the piston seals, valve stems seals, and turbochargers of the internal combustion engine. Because of the "blow-by" gases, the crankcase pressure will inherently rise, promoting leakage of oil from the crankcase. These gases, commonly referred to in the art as "blow-by" gases, need to be released.

Environmental considerations suggest that the blow-by gases in the crankcase be vented back to the combustion chamber rather than being released to the atmosphere. Accordingly, it is known to scavenge the crankcase of blow-by gases by connecting the crankcase to the engine air intake.

Blow-by gases that are released from the crankcase carry combustion by-products and oil mist caused by splashing of the engine's moving components within the crankcase and the oil pan. It is known to substantially remove the oil mist from the blow-by gas prior to introduction into the intake air system. An apparatus that removes oil mist from blow-by gases is commonly referred to as a "breather." Known breathers include breathers that include a stack of conical disks that spin at a high speed to fling heavier oil against a wall of the breather and allow gas to pass though the breather. Centrifuge type separators are disclosed for example in U.S. Pat. Nos. 7,235,177 and 6,139,595. Other types of breathers include filters such as described in U.S. Pat. Nos. 6,478,019, 6,354,283; 6,530,969; 5,113,836; swirl chambers or cyclone separators, such as described in U.S. Pat. Nos. 6,860,915; 5,239,972; or impactors, such as described in U.S. Pat. Nos. 7,258,111; 7,238,216 5,024,203. Each type of breather has advantages and limitations.

The present inventor has recognized that it would be desirable to provide a breather system that is more economical to produce and more effective in operation than existing breather systems.

SUMMARY

An exemplary embodiment of the invention provides a breather system for a crankcase of an internal combustion engine. The breather system includes a gas compressor having a compressor inlet and a compressor outlet. The gas compressor is configured to elevate the pressure of blow-by gas received into the inlet and to discharge elevated pressure gas from the compressor outlet. An inlet conduit is arranged to connect the crankcase to the compressor inlet. At least one gas-oil separator includes a gas inlet for receiving the elevated pressure gas from the compressor, an oil outlet for discharging oil separated from the elevated pressure gas, and a gas outlet for discharging a gas having a reduced oil content. The at least one outlet conduit connects the compressor outlet to the gas inlet.

The at least one gas-oil separator can comprise a swirl chamber separator in series with an impact separator. The swirl chamber separator and the impact separator can be cast as a unitary housing. The oil outlet can be flow-connected to return the separated oil to the crankcase.

According to an exemplary embodiment, the gas outlet is flow connected to an air intake for the engine to re-circulate the gas discharged from the at least one gas-oil separator.

According to another aspect of the disclosed embodiment, the at least one gas-oil separator includes a gas outlet and a bypass conduit flow connected between the gas outlet and the compressor inlet.

The compressor can be a piston pump type of compressor or other known type of compressor.

The disclosed embodiment provides a method for separating oil from crankcase gas from an internal combustion engine, including the steps of:

receiving crankcase gas outside of the crankcase and into a compressor;
pressurizing the crankcase gas using the compressor;
channeling the pressurized crankcase gas into a gas-oil separator;
separating oil from the crankcase gas in the gas-oil separator; and
returning the separated oil from the gas-oil separator to the crankcase.

The method can also include the step of directing crankcase gas from the gas-oil separator to a combustion air intake of the engine.

The method can also include the step of: if the capacity of the compressor exceeds the crankcase gas production, directing gas flow from the gas-oil separator to the compressor.

Numerous other advantages and features of the present invention will be become readily apparent from the following detailed description of the invention and the embodiments thereof, and from the accompanying drawing.

BRIEF DESCRIPTION OF THE DRAWING

The FIGURE is a schematic diagram of a breather system of the present invention.

DETAILED DESCRIPTION

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

The FIGURE is a schematic diagram that illustrates an embodiment of an engine breather system 10 according to the present invention. The system 10 is associated with an engine 20 which could be a diesel engine, such as a diesel engine for a long haul truck. The diesel engine can be normally aspirated or turbocharged. The engine 20 includes a crankcase 22 having an upper engine internal volume 23 partly defined by a valve cover 24. The upper engine internal volume is generally in fluid communication with all the blow-by gases within the crankcase.

The system 10 includes a gas compressor or pump 26 that includes a piston or a rotary impeller (not shown) or other fluid actuating device that can be belt driven, gear driven or otherwise driven by the engine 20. Alternately the compressor could be driven by another power source. A number of compressor or pump types can be used, in addition to the standard piston pump, such as a gear pump, a gear-rotor pump, a vane pump, a rotary screw pump, or a diaphragm pump. According to one embodiment, the compressor would be rated at less than 50 PSI and to maintain a relatively small size, would be capable of being driven at speeds up to 10,000 RPM. A typical maximum bow-by gas flow rate for the compressor is 700 CFH (ft$^3$/hour).

The gas compressor 26 includes an inlet 26a that is in fluid communication via a conduit 28 with the internal volume 23 by a connection to the valve cover 24. An outlet 26b of the compressor is in fluid communication with an inlet 50a of a swirl chamber separator or cyclone separator 50. Such a cyclone separator is described for example in U.S. Pat. Nos. 6,860,915 and 5,239,972, herein incorporated by reference. An outlet 50b of the swirl chamber is in fluid communication with in inlet 60a of an impactor or impact separator 60. such an impact separator is described for example in U.S. Pat. Nos. 7,258,111; 7,238,216 and 5,024,203. An outlet 60b of the impactor 60 is in fluid communication with a pressure regulator 70. The pressure regulator maintains a desired gas pressure within the impact separator and swirl chamber separator by varying the gas flow restriction through the regulator.

Oil that is separated from the gas in the swirl chamber 50 drains through an oil outlet 50c at a bottom of the swirl chamber 50. Oil that is separated from the gas in the impactor 60 drains through an oil outlet 60c at a bottom of the impactor 60. The outlets 50c, 60c can be small drain orifices. The combined oil from the outlets 50c, 60c is collected in a conduit or conduits 80 and returned to the crankcase 22.

The compressor 26 sucks blow-by gases from the crankcase 22 and compresses the blow-by gases to a pre-selected pressure, which may be below 50 PSIG. The blow-by gases are delivered into the swirl chamber 50 and then into the impactor 60 at elevated pressure. Each of the swirl chamber 50 and then into the impactor 60 separate some oil from the oil entrained blow-by gases. The pressure regulator 70 can be set to a desired working pressure to maintain elevated pressures within the components 50, 60 and allow cleaned gas to pass into a discharge conduit 90 that can either be directed to atmosphere or can be redirected to the engine intake manifold for a normally aspirated engine or to the turbocharger compressor for a turbocharged engine. Alternately, with a sufficient arrangement of valves, the discharge conduit could be directed into the exhaust system.

Pressure pulses from the compressor, in the form of a piston pump compressor, aid in the separation of oil and gas from the blow-by gases, because of the instantaneous high velocity of blow-by gases that enter the impactor.

According to one embodiment of the invention, the size of the compressor should be large enough to outpace the amount of blow-by gases that are drawn into the compressor, which may be as high as 700 CFH (ft$^3$/hour). If the compressor is of the piston type with one-way valve or valves, the piston should be orientated in a manner where the outlet valve is at the lowest point, below the piston so that any condensed oil can drain through the drain orifice and back into the engine to prevent oil from pooling and overwhelming the system when it leaves the compressor.

The swirl chamber 50 and impactor 60 typically have no moving components and the swirl chamber 50 and impactor 60 can be cast as part of a common or unitary housing.

Additionally, impactors of current design typically require high gas velocity to function. Therefore, small orifices are typically required but are restrictive such as to require a significant pressure drop. However, according to the disclosed embodiment, the compressor elevates the pressure of the blow-by gases to push the air through smaller orifices at higher velocity, i.e., more pressure drop is available. Furthermore, the high velocity of the cleaned blow-by gases from the impactor may reduce condensation and possible ice buildup in the discharge conduit 90.

A screen (not shown) can be used at each of the oil outlets 50c, 60c to protect the outlets from clogging with debris. The oil drain diameters for the outlets 50c, 60c can be sized in a manner that allows the system 10 to keep up with the amount of oil that is being separated from gas but not allow excessive loss of pressure by venting gas. During high engine speed and low power operation, the outlets 50c, 60c will normally be clear of oil and gas pressure may vent through the outlets 50c, 60c to the crankcase, which will then vent back to the compressor. This is not detrimental to the system 10 or to engine operation during these engine operating conditions.

A bypass conduit 110 can be provided to direct gas from the low pressure output of the regulator 70 at the discharge conduit 90 to a low pressure compressor intake at the conduit 28. When engine speed is high and the load is low, the compressor will be oversized for the amount of blow-by gas generated, which would result in formation of a vacuum within the engine. To avoid this condition, the bypass conduit 110 can be used to re-circulate cleaned blow-by gas from the discharge conduit 90 back into the compressor 26 where it is re-introduced to the separators 50, 60, re-cleaned and proper crankcase pressure can be maintained.

If under unusual circumstances blow-by volume from the engine exceeds compressor capacity, the excess blow-by gas will bypass the compressor through the bypass conduit 110 and discharge through the discharge conduit 90.

Parts List
10 engine breather system
20 engine
22 crankcase
23 upper engine internal volume
24 valve cover
26 pump or compressor
28 conduit
50 swirl chamber or cyclone separator
50a swirl chamber gas inlet
50b swirl chamber gas outlet
50c swirl chamber oil outlet
60 impact separator or impactor
60a impactor gas inlet
60b impactor gas outlet
60c impactor oil outlet
70 pressure regulator
80 conduits
90 discharge conduit
110 bypass conduit From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:
1. A breather system for a crankcase of an internal combustion engine, comprising:

a gas compressor having a compressor inlet and a compressor outlet, the gas compressor configured to elevate the pressure of gas received into the inlet and to discharge elevated pressure gas from the compressor outlet;

an inlet conduit arranged to connect the crankcase to the compressor inlet;

at least one gas-oil separator having a gas inlet for receiving the elevated pressure gas from the compressor, an oil outlet for discharging oil separated from the elevated pressure gas, and a gas outlet for discharging a gas having a reduced oil content; and at least one outlet conduit connecting the compressor outlet to the gas inlet, wherein the at least one gas-oil separator includes a gas outlet and comprising a bypass conduit flow connected between the gas outlet and the compressor inlet.

2. The system according to claim 1, wherein the compressor comprises a piston pump.

3. The system according to claim 2, wherein the piston pump is oriented so the compressor outlet is positioned below the piston.

4. The system according to claim 2, wherein the pump comprises at least one one-way valve.

5. The system according to claim 1, wherein the at least one gas-oil separator comprises a swirl chamber separator in series with an impact separator.

6. The system according to claim 5, wherein the swirl chamber separator and the impact separator are cast as a unitary housing.

7. The system according to claim 1, wherein the oil outlet is flow-connected to return the oil to the crankcase.

8. The system according to claim 7, wherein the gas outlet is flow connected to an air intake for the engine to re-circulate the gas with a reduced oil content discharged from the at least one gas-oil separator.

9. The system according to claim 1, wherein the gas outlet is flow connected to an air intake for the engine to re-circulate the gas with a reduced oil content discharged from the at least one gas-oil separator.

10. An internal combustion engine comprising:

an engine crankcase having cylinders and a crankcase gas outlet to relieve the engine of blow-by gas;

an air intake manifold and a fuel delivery into the cylinders;

an exhaust conduit receiving exhaust gas from the cylinders;

a gas compressor having a compressor housing having a gas inlet and a gas outlet;

a crankcase gas conduit connecting the crankcase gas outlet to the compressor gas inlet; and at least one gas-oil separator connected to the compressor gas outlet, wherein the at least one gas-oil separator includes a gas outlet and comprising a bypass conduit flow connected between the gas outlet and the compressor gas inlet.

11. The engine according to claim 10, wherein the at least one gas-oil separator comprises a swirl chamber separator and an impact separator.

12. The engine according to claim 10, wherein the at least one gas-oil separator includes an oil outlet that is flow-connected to return separated oil to the crankcase.

13. The engine according to claim 12, wherein the at least one gas-oil separator includes a gas outlet that is flow connected to an air intake for the engine to re-circulate cleaned gas discharged from the at least one gas-oil separator.

14. The system according to claim 10, wherein the at least one gas-oil separator includes a gas outlet that is flow connected to an air intake for the engine to re-circulate cleaned gas discharged from the at least one gas-oil separator.

15. A method for separating oil from crankcase gas from an internal combustion engine, comprising the steps of:

receiving crankcase gas outside of the crankcase and into a compressor;

pressurizing the crankcase gas using the compressor;

channeling the pressurized crankcase gas into a gas-oil separator;

separating oil from the crankcase gas in the gas-oil separator;

returning the separated oil from the gas-oil separator to the crankcase; and if the capacity of the compressor exceeds the crank case gas production, directing gas flow from the gas-oil separator to the compressor.

16. The method according to claim 15, comprising the further step of directing crankcase gas from the gas-oil separator to a combustion air intake of the engine. the gas-oil separator to the compressor.

* * * * *